United States Patent Office.

ARNOLD F. DÜCKWITZ, OF NEW YORK, N. Y.

Letters Patent No. 96,089, dated October 26, 1869.

IMPROVED AERATED MEDICINAL BEVERAGE.

The Schedule referred to in these Letters Patent and making part of the same.

*To all whom it may concern:*

Be it known that I, ARNOLD F. DÜCKWITZ, of New York city, in the county and State of New York, have invented a new and improved Medical Compound; and I do hereby declare that the following is a full, clear, and exact description thereof, which will enable others skilled in the art to make and use the same.

My improvement consists in combining the extract of hops with any form of carbonated water known as soda-water, thus forming a new and useful medical compound, which I denominate Hop-Soda.

Any good fluid extract of hops may be employed; but the article which I recommend as the best is the cold, compressed, concentrated fluid extract of hops, made by N. Spencer Thomas's process, patented January 31, 1865.

Of this hop-extract, take from one teaspoonful to one tablespoonful and mix it with one ordinary tumblerful of water saturated with carbonic acid, and known as carbonated water, or soda-water.

The proportions may be varied to suit the requirements of the user, and the hop-extract may be incorporated with the soda-water in connection with any sirup or cream, or in the fountain, or after the soda-water is drawn or made in the tumbler, or in any other suitable manner.

My improved hop-soda may also be prepared and bottled in the same manner as any other form of soda-water.

The bitter aromatic essential extract of hops improves the somewhat insipid taste of the soda-water, stimulates the stomach, and will prove highly useful in cases of dyspepsia, and diseases of general or local debility, sleeplessness, nervous derangement, and other disorders of the human system.

I do not limit or confine myself to any exact proportions, vehicles, or methods of combining the hop-extract with the carbonic-acid water.

Having thus described my invention,

I claim as new, and desire to secure by Letters Patent—

The medical compound herein described, made as set forth.

A. F. DÜCKWITZ.

Witnesses:
  GEO. W. MABEE,
  ALEX. F. ROBERTS.